Patented June 9, 1931

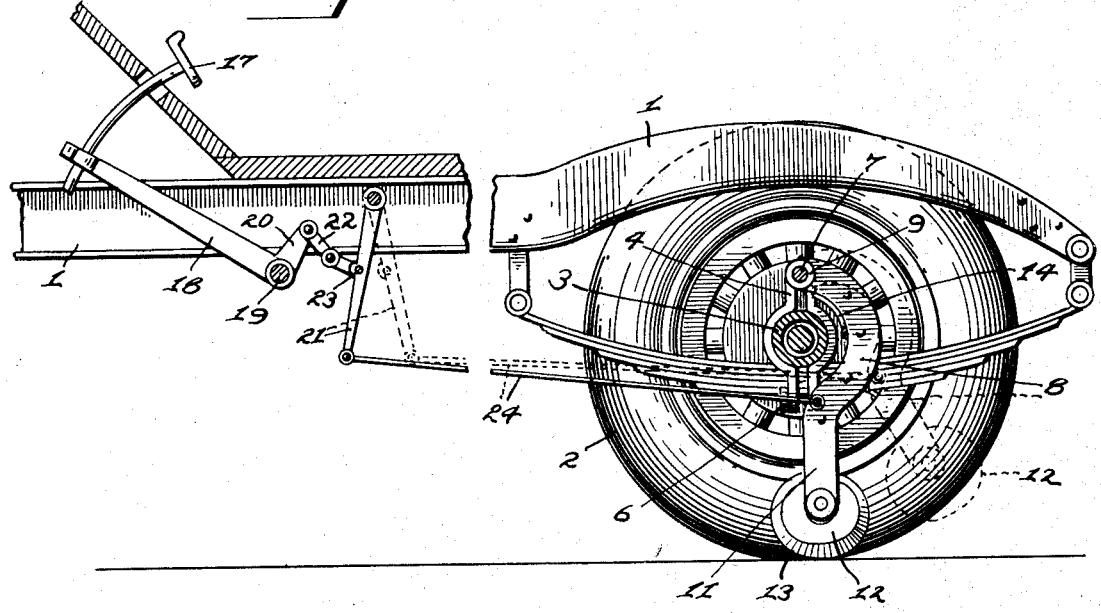
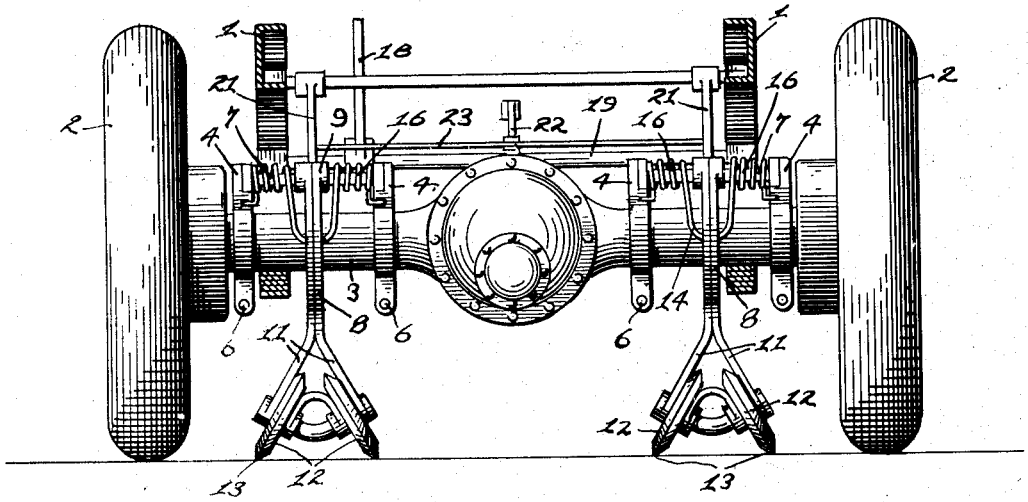

1,808,797

UNITED STATES PATENT OFFICE

CARL UHLMAN, OF SAN FRANCISCO, CALIFORNIA

ANTISKIDDING DEVICE

Application filed May 11, 1929. Serial No. 362,303.

My invention relates to improvements in anti-skidding devices for automobiles wherein arms are pivotally mounted adjacent the rear wheels of an automobile and provided with inclined rollers mounted in diverging relation and adapted to be depressed into engagement with the roadway between the wheels to prevent skidding toward either side.

The primary object of the invention is to provide an improved anti-skidding device for automobiles and the like.

Another object is to provide an improved device which may be easily and effectively operated to hold an automobile to its course and prevent skidding in either direction.

A further object is to provide an improved device of the character described adapted to be moved into a positive engagement with the roadway and to resiliently resist sideward movement of the automobile.

A still further object is to provide an improved device of simple and rugged construction which may be easily installed and which is simple and efficient in operation.

I accomplish these and other objects by means of the improved device disclosed in the drawings forming a part of the present application wherein like characters of reference are used to designate similar parts throughout the specification and drawings, and in which—

Fig. 1 is a broken side elevation of the rearward portion of an automobile equipped with my improved anti-skid device, the rear wheel being removed to disclose the manner in which the device is mounted and operated; and Fig. 2 is a broken rear elevation, partly in section of the device as shown in Fig. 1.

Referring to the drawings, the numeral 1 is used to designate in general the frame of an automobile provided with the usual rear wheels 2 mounted at the ends of the usual axle housing 3. A pair of bearing blocks 4 are secured in spaced relation upon the axle housing 3 adjacent each wheel 2. The blocks 4 preferably consist of a pair of clamp members pivotally connected at one end said members being shaped to extend around the housing and receive a securing member 6 applied through the free ends of said members to clamp the same rigidly upon the housing.

The pivoted ends of the bearing block members 4 are preferably positioned above the housing 3 and arranged to receive the ends of shafts 7 extending between the members of each pair of bearing blocks, said shafts being supported in spaced parallel relation to the axle housing.

A pair of arms 8 are pivotally mounted upon the shafts 7 and preferably arranged to permit a limited sliding movement along said shafts. Each arm 8 preferably consists of a pair of matching members having body portions secured together in proximate relation and provided with matching bearing portions 9 formed at one end thereof adapted to engage the shafts 7. The opposite ends of the arm members 8 are provided with diverging extensions 11. The body portions of the arms 8 are curved to afford clearance for the housing 3 when the arms are swung to an operative position as hereinafter more fully explained.

A pair of rollers 12 are mounted upon each arm 8, one of said rollers being rotatably mounted in proximate parallel relation to each extension 11 of said arms, thereby positioning the rollers of each pair in oppositely inclined relation and diverging toward the end of the arms 8. The edges of the rollers 12 are beveled to provide relatively sharp road engaging edges 13.

Springs 14 are mounted in connection with the shafts 7 and arms 8 to normally hold the arms in an inoperative position with the rollers 12 elevated out of engagement with the roadway. The springs are preferably provided with coil portions 16 mounted around the ends of the shafts 7 at each side of the bearing portions 9 of the arms 8 and secured to the mounting blocks 4, the center portions of the springs extending outwardly in loops engaging the under sides of the arms. The coil portions 16 operate to resiliently resist sideways movement of the arms 8 along the shafts 7.

The arms 8 are actuated preferably by means of a foot pedal 17 pivotally mounted adjacent the driver's seat of the automobile, said pedal being mounted in connection with a crank 18 mounted upon a shaft 19 provided with a crank arm 20 connected to a pair of actuating arms 21 by means of a link 22 pivotally connected between the crank arm 20 and an equalizer bar 23 extending between the arms 21. The actuating arms 21 are pivotally mounted upon the frame 1 and are connected to the arms 8 by means of links 24.

In operation, the arms 8 are normally held in an inoperative position by the springs 14, as indicated in dotted lines in Fig. 1 of the drawings. In case the automobile begins to skid, the driver, by pressing downwardly upon the pedal 17, causes the arms 8 to be swung downwardly to an operative position as indicated in full lines in the drawings, thereby causing the rollers 12 to be moved into contact with the roadway between the wheels 2. The rollers are rotatable upon their inclined axes so that they do not impede the forward movement of the automobile. The beveled edges of the rollers, particularly the rollers upon the sides of the arms 8 toward which the skid is occurring, wedge against the roadway and effectually resist sideways movement of the automobile and thereby holding the wheels 2 in their proper course and preventing further skidding. The thrust which is imposed upon the sides of the arms 8 by the wedging action of the arms and rollers is resiliently resisted by the coil portions 16. When the danger of skidding has passed, the pedal 17 is released and the arms 8 are automatically returned to their inoperative position by the springs 14.

While I have illustrated and described only the preferred embodiment of my invention, the device is of course subject to modification in numerous details of construction. I therefore do not wish to restrict myself to the exact details illustrated, but desire to avail myself of all modifications which may fall within the scope of the appended claims.

Having thus described my invention what I claim as new and desire to secure by Letters Patent is:—

1. An anti-skid device for automobiles comprising a pair of arms pivotally and slidably mounted adjacent the rear wheels of an automobile; a pair of rollers mounted upon each arm, the rollers of each pair being inclined in opposite directions and diverging toward their lower edges; means for normally holding the arms and rollers in an inoperative position; means for resiliently resisting transverse sliding movement of the arms; and means for moving the arms to an operative position with the rollers engaging the surface of the roadway between the rear wheels of the automobile to resist skidding movement of said wheels.

2. An anti-skid device for automobiles comprising a pair of arms pivotally and slidably mounted adjacent the rear wheels of an automobile and having a limited transverse sliding movement; a pair of rollers mounted upon each arm, the rollers of each pair being inclined in opposite directions and diverging toward their lower edges; means for normally holding the arms and rollers in an inoperative position; means for resiliently resisting transverse sliding movement of the arms; and pedal actuated means operable by the driver of the automobile for moving the arms to an operative position with the rollers engaging the surface of the roadway between the rear wheels of the automobile to resist skidding movement of said wheels.

3. An anti-skid device for automobiles comprising a pair of arms pivotally mounted adjacent the rear wheels of an automobile and having a limited transverse sliding movement; a pair of rollers mounted upon each arm, the rollers of each pair being inclined in opposite directions and diverging toward their lower edges; a spring mounted adjacent each arm and adapted to normally hold the arms in an inoperative position, the ends of said spring being coiled adjacent the pivot ends of the arms to resiliently resist transverse movement of said arms; and means operable by the driver of the automobile for moving the arms to an operative position with the rollers engaging the surface of the roadway between the rear wheels of the automobile to resist skidding movement of said wheels.

4. An anti-skid device for automobiles comprising a pair of arms pivotally mounted at one end adjacent the rear wheels of an automobile and each provided with a pair of diverging extensions formed upon the free end thereof; a roller rotatably mounted upon the end of each extension; spring means normally holding the arms in an inoperative position with the rollers out of engagement with the roadway; and means for moving the arms to depress the rollers against the roadway between the wheels to resist skidding movement toward either side.

5. An anti-skid device for automobiles comprising a pair of arms pivotally mounted at one end thereof adjacent a pair of wheels of an automobile and each provided with a pair of diverging extensions formed at the free end thereof; a roller rotatably mounted upon the outer end of each extension; beveled road engaging edges formed upon the rollers to resist sideways movement of the rollers upon a roadway; means for normally holding the arms in an inoperative position with the rollers out of contact with the roadway; and means for moving the arms to depress the rollers against the roadway between the wheels to resist skidding movement toward either side.

6. An anti-skid device for automobiles comprising a pair of arms mounted between a pair of wheels of an automobile and each consisting of a pair of matching members provided with body portions secured in proximate relation and having bearings formed at one end of each body portion and inclined extensions outwardly diverging at the opposite ends; mounting means mounted between the wheels and engaging the bearings to pivotally support the arms; rollers provided with beveled road engaging edges rotatably mounted upon the outer ends of the inclined extensions; spring means mounted in connection with the arms and mounting means to normally hold the arms in an inoperative position with the rollers out of engagement with the roadway; and means for moving the arms to depress the rollers against the roadway between the wheels to resist skidding movement toward either side.

7. An anti-skid device for automobiles comprising a pair of arms each consisting of a pair of matching members provided with body portions secured in proximate relation and having bearings formed at one end of each body portion and inclined extensions outwardly diverging at the opposite ends; a pair of spaced bearing blocks clamped upon an axle member extending between a pair of wheels of an automobile; pivot shafts mounted within the bearing blocks and engaging the bearing portions of the arms to pivotally support the same; rollers provided with beveled road engaging edges rotatably mounted upon the outer ends of the inclined extensions; springs mounted upon the pivot shafts and engaging the arms to normally hold said arms in an inoperative position with the rollers out of engagement with the roadway; and means for moving the arms to depress rollers against the roadway between the wheels to resist skidding movement toward either side.

8. An anti-skid device for automobiles comprising a pair of arms mounted between a pair of wheels of an automobile and each consisting of a pair of matching members provided with body portions secured in proximate relation and having bearings formed at one end of each body portion and inclined extensions outwardly diverging at the opposite ends; a pair of spaced bearing blocks clamped upon an axle member extending between the pair of wheels; pivot shafts mounted within the bearing blocks and engaging the bearing portions to the arms and adapted to permit a pivotal and sliding movement of the arms; rollers provided with beveled road engaging edges rotatably mounted upon the outer ends of the inclined extensions; springs mounted upon the shafts and engaging the arms to normally hold said arms in an inoperative position with the rollers out of engagement with the roadway, said springs having coiled portions upon opposite sides of the bearing portions of the arms to resiliently resist sliding movement of the arms upon the shaft; and means for moving the arms to depress the rollers against the roadway between the wheels to resist skidding movement toward either side.

In witness whereof, I hereunto set my signature.

CARL UHLMAN.